United States Patent Office 3,154,943
Patented Nov. 3, 1964

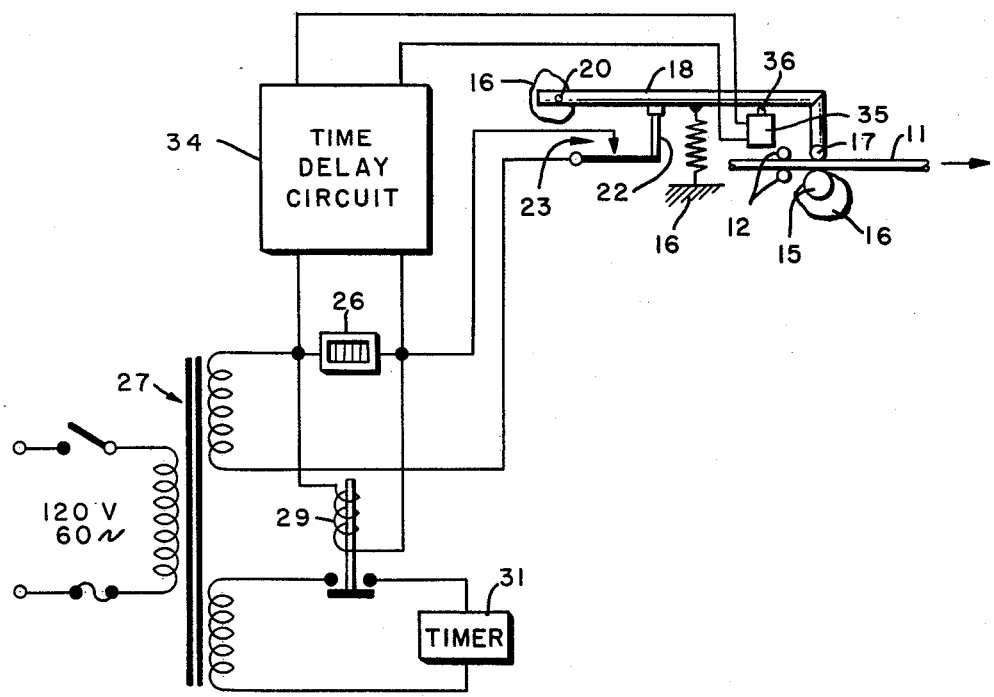

3,154,943
SLUB DETECTOR
Lewis C. Garrett, Durham, N.C., and Hunter S. Woodbery, Decatur, Ala., assignors to Monsanto Company, a corporation of Delaware
Original application Dec. 8, 1959, Ser. No. 858,166. Divided and this application Nov. 6, 1962, Ser. No. 235,803
5 Claims. (Cl. 73—160)

The present invention relates to slub indicating apparatus and more particularly to slub indicating apparatus for recording the number of slubs during the manufacture of filaments, yarns, threads, and the like. This application is a division of application Serial Number 858,-166, filed December 8, 1959, now abandoned.

It is known, in the course of manufacturing filament material, physical defects are apt to occur which change the material's cross-sectional area. Any inconsistencies in the cross-sectional area of the filament have a deleterious effect in the filament's manufacturing process, especially during spinning and stapling, by causing breaks and the build-up of fly. Obviously, it is desirable to determine the existence of slubs, wads or knots of fiber, and their effect in the manufacture of filament material, in an attempt to obtain a marketable end product.

Hence, it is desirable to have a slub indicator providing a continuous measurement of the number and length of slubs occurring in the manufacture of filament material. In addition to obtaining slub measurements, the indicator could determine other filament characteristics, such as grade, evenness rating, and the like, to improve the manufacturing techniques for filament material. The detection of slubs is extremely difficult and many of the devices presently in use are not as reliable as is desired. With this problem in mind, one of the objects of this invention is to provide a novel and improved device for detecting slubs in a filament or yarn.

Another object of the present invention is to provide an apparatus for mechanically detecting the presence of a slub in a filamentary material and translating the mechanical motion into an electrical signal.

A further object is to provide a slub indicating apparatus suitable for measuring the number and length of slubs in the manufacture of filamentary material.

A still further object of this invention is to provide a slub detector which is automatically opened to pass stray filaments.

The present invention in its preferred form comprises a slub indicating apparatus having a movable arm with a switch operatively coupled thereto for translating the mechanical motion of the arm into an electrical signal. A slight mechanical movement of the arm in response to the presence of slub in the filament material is translated into an electrical signal which operates a counter. If the signal duration is of a predetermined value, a time delay network connected across the counter energizes a solenoid to lift the arm. This clears any loose filaments from the arm.

Other objects and advantages of this invention will become apparent as the following description is read in conjunction with the accompanying drawing, in which the single figure is a schematic diagram of the apparatus and the circuit used therewith.

Referring now in detail to the drawing, a filament or yarn 11 is shown being advanced between a pair of guide pins 12 by advancing means (not shown) of a well known type. The filament or yarn 11 passes between a backing rod 15 attached to a base or frame 16 (shown only fragmentarily) and a sensing rod 17 which is secured to a movable arm 18. The arm 18 is pivotally attached to the frame 16 at pivot point 20. A spring 19 attached as shown urges the sensing rod 17 toward the backing rod 15, the yarn 11 passing therebetween. Slubs on the yarn 11 will pivot the arm 18 counterclockwise about the pivot point 20.

When a slub raises the arm 18 a contactor 22 moves to close a switch 23, the contactor 22 being in engagement with the arm 18. Closure of the switch 23 applies power to a counter 26 from a power supply 27. The purpose of the counter 26 is to record the number of slubs in the yarn 11.

Closure of the switch 23 also applies power to a relay 29 to apply power to a timer 31. The purpose of the timer 31 is to record the total duration of the closure of the switch 23. Knowing the yarn speed, one can determine the average slub length by dividing the timer reading by the counter reading and multiplying the result by the yarn speed.

Occasionally, loose filaments on the yarn 11 will hang on the sensing rod 17. Because the stray filaments remain between the sensing rod 17 and the backing rod 15, an erroneous timer reading will result. To overcome this, an arrangement is provided for lifting the arm 18 to free the loose filament after a predetermined time interval.

A time delay circuit 34 of a well known type is connected across the counter 26 so that the delay circuit is energized with the counter. The output of the delay circuit is connected to a solenoid 35 which has a plunger 36 positioned to engage and lift the arm 18 upon energization of the solenoid. The delay circuit is such that the solenoid 35 is not energized until after the delay circuit has been energized for a predetermined time interval. This time interval is such that, upon passage of normal slubs through the device, the solenoid 35 is not energized. If, however, a loose filament hangs between the sensing rod 17 and the backing rod 15, the delay circuit 34 will remain energized long enough to energize the solenoid 35 and thereby lift the arm 18 to allow the moving yarn 11 to carry away the loose filament.

The delay circuit, which may be a timer or like device, may be set to energize the solenoid momentarily or to keep the solenoid energized for a predetermined time interval. Timers which will accomplish this result are well known. Usually, the loose filament will be carried away by the moving yarn when the arm 18 is raised momentarily.

It can readily be seen that the slub detector of the present invention will not only count slubs and determine slub length, but will also automatically clear itself of any stray filaments, knots or pills of yarn which hang in the device.

It is to be understood that the embodiment disclosed herein may be modified or altered and that numerous other embodiments can be contemplated which will fall within the spirit and scope of the invention.

What is claimed is:

1. A slub detector, comprising a fixed element, a movable element, means connected to the movable element for urging said movable element toward the fixed element to sense a yarn passing therebetween, means connected to the movable element for sensing movement of said movable element away from said fixed element, and delay means connected to the movable element for moving said movable element away from the fixed element after the sensing element has remained actuated for a predetermined time interval.

2. A slub detector, comprising a frame, an element mounted on the frame for supporting a moving filament, an arm movably mounted on the frame and having a portion in engagement with the element so that the filament passes therebetween, means connected to the arm for detecting movement of said arm, and means connected to the detecting means for elevating the arm after said detecting means has been actuated for a predetermined time interval.

3. A slub detector, comprising a frame, a backing rod attached to the frame for supporting a moving yarn, an arm pivotally mounted on the frame and having a sensing rod parallel to the backing rod, means connected to the arm for engaging the sensing rod toward the backing rod, a switch positioned to sense movement of the arm away from the backing rod, a power supply, a counter connected to the power supply through the switch, delay means connected across the counter, and a solenoid connected to the delay means for moving the arm away from the backing rod after the delay means has been energized for a predetermined time interval.

4. A slub detector, comprising a frame, a backing rod secured to the frame, an arm pivotally mounted on the frame and having secured thereto a sensing rod positioned parallel to the backing rod, a spring connected between the arm and the frame for urging the sensing rod toward the backing rod for sensing a yarn passing therebetween, a switch positioned to sense movement of the arm away from the backing rod, a power supply, a counter connected through the switch to the power supply, a delay circuit connected across the counter, and a solenoid having a plunger positioned to engage and move the arm away from the backing rod, said solenoid being connected to the delay circuit for moving the arm after the delay circuit has remained energized for a predetermined time interval.

5. A slub detector, comprising a frame, a backing rod mounted on the frame for supporting a moving filament, an arm pivotally attached to the frame and having a portion in engagement with the backing rod so that the filament passes therebetween, means connected to the arm for urging said arm toward the backing rod, a switch positioned to sense movement of the arm away from the backing rod, a power supply, a counter connected through the switch to the power supply so that when the arm is moved away from the backing rod the counter is energized, a timer, means energized by closure of the switch for connecting the timer to the power supply, a delay circuit connected across the counter, and a solenoid connected to the output of the delay circuit for moving the arm away from the backing rod after the delay circuit has been energized for a predetermined time interval.

References Cited in the file of this patent

UNITED STATES PATENTS 2,292,986    Barnes _____ Aug. 11, 1946